United States Patent
Chen et al.

(10) Patent No.: US 8,449,937 B2
(45) Date of Patent: May 28, 2013

(54) EDIBLE PET CHEW AND PREPARATION OF SAME

(75) Inventors: Zuxi Chen, Wenzhou (CN); Zuhua Chen, Wenzhou (CN)

(73) Assignee: Wenzhou Yuxiang Pet Product Co., Ltd., East Shuitou Town (CN)

(*) Notice: Subject to any disclaimer, the term of this patent is extended or adjusted under 35 U.S.C. 154(b) by 314 days.

(21) Appl. No.: 12/925,509

(22) Filed: Oct. 22, 2010

(65) Prior Publication Data

US 2012/0079992 A1    Apr. 5, 2012

(30) Foreign Application Priority Data

Sep. 30, 2010  (CN) .......................... 2010 1 0298106

(51) Int. Cl.
 *A23K 1/18* (2006.01)
 *A01K 29/00* (2006.01)

(52) U.S. Cl.
 USPC ............. 426/560; 426/250; 426/92; 426/635; 426/805

(58) Field of Classification Search
 USPC .................... 426/560, 250, 92, 635, 805
 See application file for complete search history.

(56) References Cited

U.S. PATENT DOCUMENTS

| | | | |
|---|---|---|---|
| 6,379,725 B1 * | 4/2002 | Wang et al. | 426/72 |
| 6,455,083 B1 * | 9/2002 | Wang | 426/104 |
| 6,584,938 B2 * | 7/2003 | Sherrill et al. | 119/710 |
| 6,895,900 B2 * | 5/2005 | Hingst | 119/710 |
| 7,579,038 B1 * | 8/2009 | Weinberg | 426/656 |
| 2005/0153040 A1 * | 7/2005 | Axelrod et al. | 426/516 |
| 2005/0233038 A1 * | 10/2005 | Weinberg | 426/284 |
| 2005/0266146 A1 * | 12/2005 | Shu | 426/641 |
| 2008/0118606 A1 * | 5/2008 | Stern | 426/92 |
| 2009/0035294 A1 * | 2/2009 | Mahe et al. | 424/94.63 |
| 2009/0235872 A1 * | 9/2009 | Filipi et al. | 119/710 |

* cited by examiner

*Primary Examiner* — Chhaya Sayala
(74) *Attorney, Agent, or Firm* — Davidson, Davidson & Kappel, LLC

(57) ABSTRACT

A pet chew includes an outer layer and an inner layer, the outer and inner layers being laminated and rolled into a cylindrical shape having knots at both ends, the outer layer including, in weight percent, 28 to 49 percent plant-based material, at least 30 percent meat-based material and at least 20 percent animal hide-based material. Preparation methods are also disclosed.

6 Claims, 1 Drawing Sheet

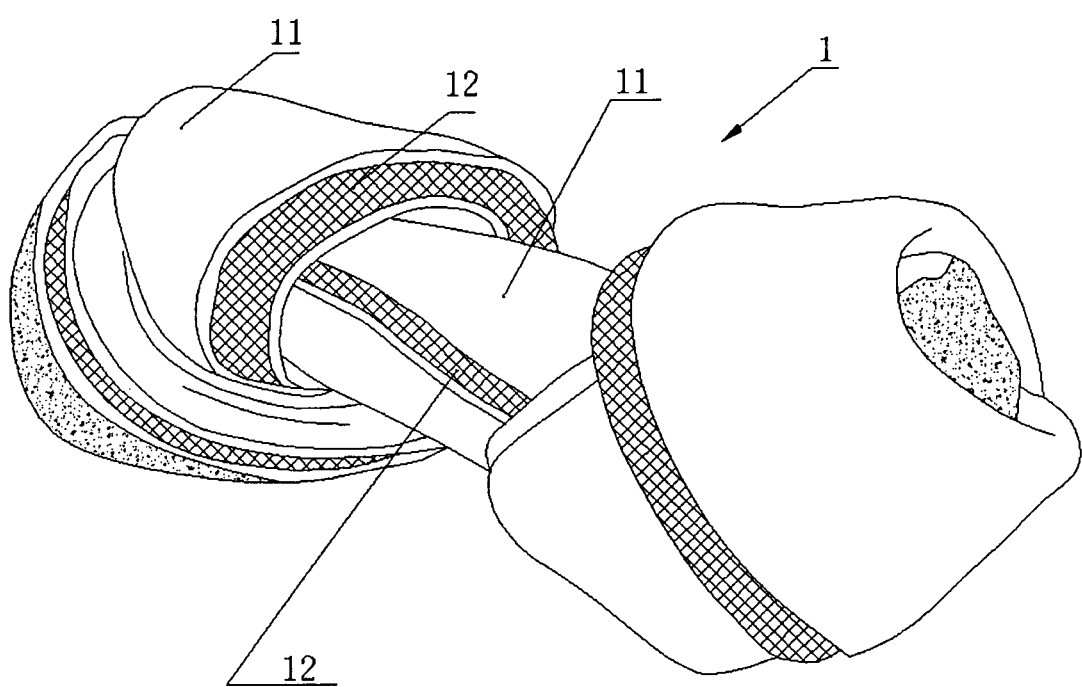

EDIBLE PET CHEW AND PREPARATION OF SAME

This claims the benefit of Chinese Patent Application No. 201010298106, filed Sep. 30, 2010 and hereby incorporated by reference herein.

The present invention related to an edible pet chew and a preparation method of same.

BACKGROUND OF THE INVENTION

At present, edible pet chews produced from the prior art typically are made from rawhide and jerky, for example in the shape of a knotted bone, as described for example in U.S. Pat. No. 5,673,673. Such traditional knotted bone from rawhide, produced for the purpose of teeth grinding and chewing, has the disadvantages of mono-nutrition, excessively hard skin and poor palatability as well as environmental pollution, high cost and an insufficient source of raw materials.

U.S. Pat. No. 7,677,203, describes a knotted bone pet chew produced with plant starch as a main raw material for the outer casing. With plant starch as a main raw material, this chew has only the characteristics of dog feed and little or no teeth grinding and chewing functions

SUMMARY OF THE INVENTION

To eliminate the defects of the existing technology, one purpose of the present invention is to provide a pet chew with rich nutrition, teeth grinding and chewing functions and good palatability; another alternate or additional object of the present invention is to provide a preparation method for the pet chew.

The present invention provides a pet chew comprising: an outer layer and an inner layer, the outer and inner layers being laminated and rolled into a cylindrical shape having knots at both ends, the outer layer including, in weight percent, 28 to 49 percent plant-based material, at least 30 percent meat-based material and at least 20 percent animal hide-based material.

The present invention also provides a preparation method for the pet chew comprising: processing the animal-hide based material in a rotary drum, agitating the plant-based material, meat-based material, and animal-hide based material, extruding the agitated material, and slicing the agitated material into sheets.

The present invention also provides a preparation method for pet chews comprising: an outer layer processing, an inner layer processing and a forming procedure; the outer layer processing including: treating ox or cow split leather leftovers in a rotary drum, then dried, pulverized and baked to crisp, and finally ground into fine powder; processing beef and chicken breast in a meat grinder into paste☐agitating and mixing corn starch, wheat powder, the treated ox or cow split leather leftovers, and branching oligosaccharide and mineral in an agitator; putting the processed beef and chicken breast into the agitator and agitating the materials in the agitator once more; and dyeing, flavoring and beating the leather leftover and chicken and beef mixture in a stainless steel dough maker by beating and rotating the leather leftover and chicken and beef mixture while adding a mixed liquid composed of glycerin, fish oil, multiple vitamin, hydrous edible salt, hydrous potassium sorbate, natural essence and food pigment; and aging and slice-making the dyes, flavored and beat material into an extruder, and the material, after being aged, being cut into slices through dies.

In one specific embodiment the present invention provides the following: a pet chew includes an outer layer and an inner layer, with the outer and inner layers laminated, rolled into a cylindrical shape with the resultant body knotted at both ends, characterized in that said outer layer includes, in weight percent, 28-33 corn starch, 14-16 wheat flour, 10-12 beef, 20-23 chicken breast, 20-23 ox or cow split leather leftovers and the rest as auxiliary materials.

This embodiment may further include that the auxiliary material includes, in weight percent, 4-4.5 glycerin, 1.5-2 fish oil, 1-1.5 branching oligosaccharide, 0.9-1 salt, 0.01-0.015 multiple vitamin, 0.01-0.015 mineral, 0.01 potassium sorbate, 0.2 natural essence and 0.2 edible pigment.

The inner layer of this embodiment may include, in weight percent, 90 chicken breast, 8 corn starch, 2 glycerin, 0.02 potassium sorbate and 0.1 edible pigment.

The functions of each component of the disclosed embodiment can be as follows: 1. The corn starch and wheat powder serve as a staple food to increase the caloric content of said chew☐2. the ox split leather leftovers can increase animal collagen content and chewing toughness, beneficial to the health of pet teeth☐3. the beef and chicken breast, with a good palatability and thus acting as an attractant, are the favorites of dogs and contain multiple nutritious microelements such as animal protein, calcium and phosphorus, which are essential to strengthening dogs' bones and physique☐4. the glycerin and salt, as condiments☐can retard food spoilage☐5. the fish oil has multiple nutritious elements and also serves as a condiment☐6. the branching oligosaccharide is helpful to digestion☐7. multiple vitamins and minerals can also strengthen a dog's physique; 8. the natural essence and edible pigment can increase the taste of said chew☐9. the potassium sorbate also plays a role in preventing food spoilage.

The beneficial results of the disclosed embodiment are: adopting low fat grains such as corn starch and wheat flour, beef and chicken (favorites of dogs), and especially the fine powder of ox or cow split leather leftovers, improves the nutrition and chewing toughness of said chew of the present invention and provides ox or cow flavor. Said product, besides containing the above described main raw material, with addition of multiple nutritious substances, is more suitable for feeding different sizes of dogs to achieve the purposes of improving physique and bones, cleaning oral cavity and sufficient digestion of dogs. Dogs of varied sizes can digest 95% of said chew after consuming the product. Another advantage of said chew lies in that said product, available at a low price, has a rich source of its raw material and no pollution.

The present invention also provides a specific embodiment for the preparation method for pet chews, characterized in that said preparation method includes outer layer processing procedures, inner layer processing procedures and forming procedures.

Said outer layer processing of this specific embodiment includes the following steps:
  (1) Steps for ox or cow split leather leftover treatment: Ox or cow split leather leftovers are treated in a rotary drum, then dried, pulverized and baked to crisp, and finally ground into fine powder.
  (2) Beef and chicken breast beating step: Beef and chicken breast are processed in a meat grinder into paste.
  (3) Agitating and mixing step☐First put corn starch, wheat powder, fine powder of ox or cow split leather leftovers processed in Step 1, branching oligosaccharide and mineral into an agitator in sequence and mix the material. Then put the pasted chicken meat processed in Step 2 in the agitator and agitate the materials in the agitator once more to ensure their intensive mixing.

(4) Dyeing, flavoring and beating step: Put the material processed in Step 3 into a stainless steel dough maker and keep beating and rotating the material, and add a mixed liquid composed of glycerin, fish oil, multiple vitamin, hydrous edible salt, hydrous potassium sorbate, natural essence and food pigment.

(5) Aging and slice-making step: Add gradually the material processed in Step 4 into an extruder, and the material, after being aged, is cut into slices through dies.

Said inner layer processing procedures of the specific embodiment include the following steps:

(1) Material mixing step: Put chicken breast, corn starch, glycerin, potassium sorbate and food pigment into a stainless steel dough maker. Mix and beat said materials until they become tough.

(2) Aging and slice-making step: Have the material processed in Step 1 aged in an extruder and then cut into slices through dies.

Said forming procedures of the specific embodiment include the following steps: Laminate the thin slices from both the outer layer processing and inner layer processing, roll said slices into a cylindrical shape and then make knots at both ends of processed slices.

Still further description of the specific embodiment: The treatment of ox or cow split leather leftovers in the rotating drum includes the following procedures:

(1) After ox or cow split leather is cleaned, subject it to deliming treatment. Specifically, said split leather is mixed with water in a ratio of 1:3 and then add ammonium chloride in 2.5-3.5 percent of the above mixture weight. Agitate the mixture until the pH value at the section of said split leather is up to 13-15 and then remove said split leather for its cleaning.

(2) Acid expansion step: Depending on the weight of said split leather processed in Step 1, put said split leather into 0.5-1% sulfur and make agitating till said split leather acquires intensive expansion, becoming semitransparent and pH value at the section of said split leather is up to 3-5.

(3) Bleaching and disinfecting step: Depending on the weight of said split leather processed in Step 2, put said split leather into 0.5-1% hydrogen peroxide and make agitating until the pH value at the section of said split leather is up to 6-8. Then flush said leather.

BRIEF DESCRIPTION OF THE DRAWINGS

FIG. 1 is a schematic view of the product of the present invention.

DETAILED DESCRIPTION

With reference to FIG. 1, the pet chew 1 released in the present invention includes an outer layer 11 and an inner layer 12. Said layer 11 and layer 12 are laminated and rolled into a cylindrical shape. The resultant cylindrical body is knotted at its both ends. Said outer layer includes, in weight percent, 28-33 corn starch, 14-16 wheat flour, 10-12 beef, 20-23 chicken breast, 20-23 ox or cow split leather leftovers and the rest as auxiliary materials.

Said auxiliary materials include, in weight percent, 4-4.5 glycerin, 1.5-2 fish oil, 1-1.5 branching oligosaccharide, 0.9-1 edible salt, 0.01-0.015 multiple vitamin, 0.01-0.015 mineral, 0.01 potassium sorbate, 0.2 natural essence and 0.2 edible pigment.

Said inner layer includes, in weight percent, 90 chicken breast, 8 corn starch, 2 glycerin, 0.02 potassium sorbate and 0.1 edible pigment.

A preparation method for pet chews, characterized in that said preparation method includes outer layer 11 processing procedures, inner layer 12 processing procedures and forming procedures.

The processing procedures of said outer layer 11 include the following steps:

(1) Steps for ox or cow split leather leftover treatment: Ox or cow split leather leftovers are treated in a rotary drum, then dried, pulverized and baked to crisp, and finally ground into fine powder.

(2) Beef and chicken breast beating step: Beef and chicken breast are processed in a meat grounder into paste.

(3) Agitating and mixing step□First put corn starch, wheat powder, fine powder of ox or cow split leather leftovers processed in Step 1, branching oligosaccharide and mineral into an agitator in sequence and mix the material. Then put the pasted chicken meat processed in Step 2 in the agitator and agitate the materials in the agitator once more to ensure their intensive mixing.

(4) Dyeing, flavoring and beating step: Put the material processed in Step 3 into a stainless steel dough maker and keep beating and rotating the material, and add a mixed liquid composed of glycerin, fish oil, multiple vitamin, hydrous edible salt, hydrous potassium sorbate, natural essence and food pigment.

(5) Aging and slice-making step: Add gradually the material processed in Step 4 into an extruder, and the material, after being aged, is cut into slices through dies.

The processing procedures of said inner layer 12 include the following steps:

(1) Raw material mixing step: Put chicken breast, corn starch, glycerin, potassium sorbate and food pigment into a stainless steel dough maker. Mix and beat said materials until they become tough.

(2) Aging and slice-making step: Have the material processed in Step 1 aged in an extruder and then cut into slices through dies.

Said forming procedures include the following steps: Laminate the thin slices from both the outer layer 11 processing steps and the inner layer 12 processing steps, roll said slices into a cylindrical shape and then make knots at both ends of each the resultant cylindrical bodies.

The treatment of ox or cow split leather leftovers of the present invention in the rotating drum includes the following procedures:

(1) After ox or cow split leather is cleaned, subject it to deliming treatment. Specifically, said split leather is mixed with water in a ratio of 1:3 and then add ammonium chloride in 2.5-3.5 percent of the above mixture weight. Agitate the mixture until the pH value at the section of said split leather is up to 13-15 and then remove said split leather for its cleaning.

(2) Acid expansion step: Depending on the weight of said split leather processed in Step 1, put said split leather into 0.5-1% sulfur and make agitating till said split leather acquires full expansion, becoming semitransparent and pH value at the section of said split leather is up to 3-5.

(3) Bleaching and disinfecting step: Depending on the weight of said split leather processed in Step 2, put said split leather into 0.5-1% hydrogen peroxide and agitate until the pH value at the section of said split leather is up to 6-8. Then flush said leather.

What is claimed is:

1. A pet chew comprising:
an outer layer and an inner layer, the outer and inner layers being placed together and rolled into a cylindrical shape having knots at both ends, the outer layer including, in weight percent, 28 to 49 percent plant material, at least 30 percent meat material and at least 20 percent animal hide material.

2. The pet chew as recited in claim 1 wherein the plant material includes corn starch and wheat flour, the meat material beef and chicken and the animal hide material ox or cow split leather.

3. The pet chew as recited in claim 2 wherein the plant material includes, in weight percent, 28-33 corn starch and 14-16 wheat flour, the meat material 10-12 beef and 20-23 chicken breast and the animal hide material 20-23 ox or cow split leather.

4. The pet chew as recited in claim 1 further comprising auxiliary material including, in weight percent, 4-4.5 glycerin, 1.5-2 fish oil, 1-1.5 oligosaccharide, 0.9-1 salt, 0.01-0.015 multiple vitamin, 0.01-0.015 mineral, 0.01 potassium sorbate, and 0.2 edible pigment.

5. The pet chew as recited in claim 1 wherein the inner layer includes, in weight percent, 90 chicken breast, 8 corn starch, 2 glycerin, 0.02 potassium sorbate and 0.1 edible pigment.

6. The pet chew as recited in claim 1 wherein the inner layer is jerky.

* * * * *